US011214115B2

(12) United States Patent
Harper et al.

(10) Patent No.: US 11,214,115 B2
(45) Date of Patent: Jan. 4, 2022

(54) TEMPERATURE MANAGEMENT SYSTEMS AND METHODS FOR ELECTRIC VEHICLE

(71) Applicant: Proterra Inc., Burlingame, CA (US)

(72) Inventors: James Harper, Greenville, SC (US); Kevin Myers, Greenville, SC (US); David Lai, Redwood City, CA (US)

(73) Assignee: PROTERRA INC., Burlingame, CA (US)

( * ) Notice: Subject to any disclaimer, the term of this patent is extended or adjusted under 35 U.S.C. 154(b) by 208 days.

(21) Appl. No.: 16/429,222

(22) Filed: Jun. 3, 2019

(65) Prior Publication Data

US 2020/0376920 A1 Dec. 3, 2020

(51) Int. Cl.
| | |
|---|---|
| *B60H 1/00* | (2006.01) |
| *B60L 58/24* | (2019.01) |
| *H01M 10/66* | (2014.01) |
| *H01M 10/63* | (2014.01) |
| *H01M 10/6556* | (2014.01) |
| *H01M 10/6568* | (2014.01) |
| *H01M 10/625* | (2014.01) |

(52) U.S. Cl.
CPC ..... *B60H 1/00278* (2013.01); *B60H 1/00371* (2013.01); *B60H 1/00392* (2013.01); *B60L 58/24* (2019.02); *H01M 10/625* (2015.04); *H01M 10/63* (2015.04); *H01M 10/6556* (2015.04); *H01M 10/6568* (2015.04); *H01M 10/66* (2015.04); *B60Y 2200/91* (2013.01); *B60Y 2306/05* (2013.01); *H01M 2220/20* (2013.01)

(58) Field of Classification Search
CPC ............ B60H 1/00278; B60H 1/00392; B60Y 2200/91; Y02T 10/70; Y02E 60/10
See application file for complete search history.

(56) References Cited

U.S. PATENT DOCUMENTS

| | | | |
|---|---|---|---|
| 7,147,071 B2 * | 12/2006 | Gering | ................... B60L 58/27 237/12.3 B |
| 8,453,773 B2 | 6/2013 | Hill et al. | |
| 9,669,719 B1 | 6/2017 | Gerber et al. | |
| 2013/0193918 A1 | 8/2013 | Sarkar et al. | |
| 2014/0070767 A1 | 3/2014 | Morris et al. | |

(Continued)

*Primary Examiner* — Ana M Vazquez
(74) *Attorney, Agent, or Firm* — Bookoff McAndrews, PLLC

(57) ABSTRACT

A temperature control system for an electric vehicle includes a cabin temperature control system configured to control flow of a refrigerant through one or more heat exchangers to control a temperature of a cabin of the electric vehicle, a battery temperature control system configured to control the flow of a coolant through one or more heat exchangers to control a temperature of a battery system of the electric vehicle, and a power electronics temperature control system configured to control the flow of coolant through one or more heat exchangers to control a temperature of one or more power electronics. In a first configuration of the temperature control system, the battery temperature control system and the power electronics temperature control system may be thermally isolated, and, in a second configuration, the battery temperature control system and the power electronics temperature control system may thermally interact.

20 Claims, 6 Drawing Sheets

(56) References Cited

U.S. PATENT DOCUMENTS

2014/0109613 A1\* 4/2014 Ohno .................. F25B 13/00
  62/498
2017/0021698 A1\* 1/2017 Hatakeyama ......... B60H 1/143
2018/0205123 A1 7/2018 Walker
2019/0135071 A1\* 5/2019 Hwang ............. B60H 1/32284

\* cited by examiner

TEMPERATURE MANAGEMENT SYSTEMS AND METHODS FOR ELECTRIC VEHICLE

TECHNICAL FIELD

Embodiments of this disclosure relate to systems and methods for managing temperatures of various systems of an electric vehicle.

BACKGROUND

An electric vehicle, also referred to as an electric drive vehicle, uses an electric motor for propulsion. Electric vehicles may include all-electric vehicles where the electric motor is the sole source of power, and hybrid electric vehicles that include an auxiliary power source in addition to the electric motor. In an electric vehicle, energy is stored in a battery system located in the electric vehicle. Typically, the battery system for an electric vehicle includes multiple batteries connected together. To power the electric motor and other electrical accessories of the electric vehicle, energy is discharged from the battery system. When the stored energy decreases, the battery system is charged (or recharged) by connecting the vehicle to an external or auxiliary power supply. Charging (and discharging) may increase the temperature of the battery system. The amount of current that may be directed into the battery system during charging, and drawn out of the battery system during discharging, depends on the specific operating conditions (e.g., temperature) of the battery system. To increase the life and efficiency of the battery system, it is desirable to maintain the temperature of the battery system within a desired temperature range. Electric vehicles may include a battery cooling and heating system that is used to maintain the battery system within the desired temperature range. Additionally, electric vehicles often include a passenger cabin and one or more power electronic systems (motors, inverters, converters, air compressors, etc.). The passenger cabin and the power electronic systems may also be cooled or heated during operation of the electric vehicle. Connecting the cooling and/or heating system of one or more of the battery system, the passenger cabin, and the power electronic systems may increase the operation range or otherwise increase the efficiency of the electric vehicle's operation.

SUMMARY

Embodiments of the present disclosure relate to, among others, systems and methods for cooling or heating the battery system, the passenger cabin, and the power electronic systems of electric vehicles. Each of the embodiments disclosed herein may include one or more of the features described in connection with any of the other disclosed embodiments.

In one embodiment, a temperature control system for an electric vehicle may include a cabin temperature control system configured to control flow of a refrigerant through one or more heat exchangers to control a temperature of a cabin of the electric vehicle, a battery temperature control system configured to control the flow of a coolant through one or more heat exchangers to control a temperature of a battery system of the electric vehicle, and a power electronics temperature control system configured to control the flow of coolant through one or more heat exchangers to control a temperature of one or more power electronics. In a first configuration of the temperature control system, the battery temperature control system and the power electronics temperature control system may be thermally isolated, and, in a second configuration, the battery temperature control system and the power electronics temperature control system may thermally interact.

In another embodiment, a method of operating a temperature control system of an electric vehicle may include directing a flow of coolant (a) through fluid conduits of a battery temperature control system to control a temperature of a battery system of the electric vehicle and/or (b) through fluid conduits of a power electronics temperature control system to control the temperature of power electronics of the electric vehicle, and selecting between a first configuration and a second configuration of the temperature control system. In the first configuration, the coolant in the fluid conduits of the battery temperature control system does not intermix with the coolant in the fluid conduits of the power electronics temperature control system. In the second configuration, the coolant in the fluid conduits of the battery temperature control system intermixes with the coolant in the fluid conduits of the power electronics temperature control system.

In yet another embodiment, an electric vehicle may include a body enclosing a cabin, wherein a temperature in the cabin is regulated by a cabin temperature control system, a battery system to power the electric vehicle, wherein a temperature of the battery system is regulated by a battery temperature control system, one or more power electronics, wherein a temperature of the one or more power electronics is regulated by a power electronics temperature control system, and a controller. The controller may be configured to selectively (a) thermally decouple the cabin temperature control system, the battery temperature control system, and the power electronics temperature control system from each other, and (b) thermally couple at least two of the cabin temperature control system, the battery temperature control system, and the power electronics temperature control system together.

BRIEF DESCRIPTION OF THE DRAWINGS

The accompanying drawings, which are incorporated in and constitute a part of this specification, illustrate exemplary embodiments of the present disclosure and together with the description, serve to explain the principles of the disclosure.

DETAILED DESCRIPTION

The present disclosure describes systems and methods for heating or cooling the battery system, the passenger cabin, and the power electronic systems of an electric vehicle. While principles of the current disclosure are described with reference to an electric bus, it should be understood that the disclosure is not limited thereto. Rather, the systems of the present disclosure may be used to heat or cool any battery system, passenger cabin, or power electronic system (of any electric vehicle (car, train, etc.), machine, tool, appliance, etc.). In this disclosure, the terms "about," "substantially," or "approximate" are used to indicate a potential variation of 10% of a stated value.

Figure 1A:
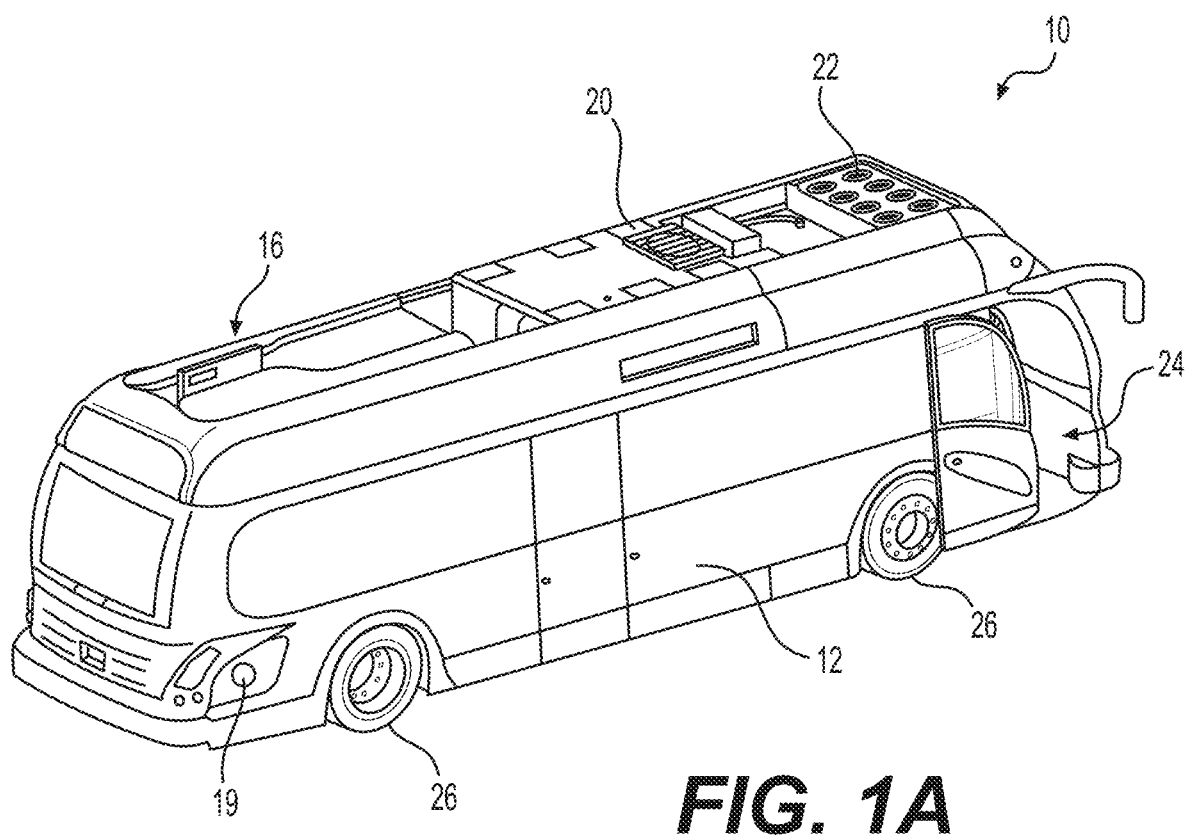
FIGS. 1A and 1B illustrate different views of an exemplary electric bus having a battery system.
Figure 1B:
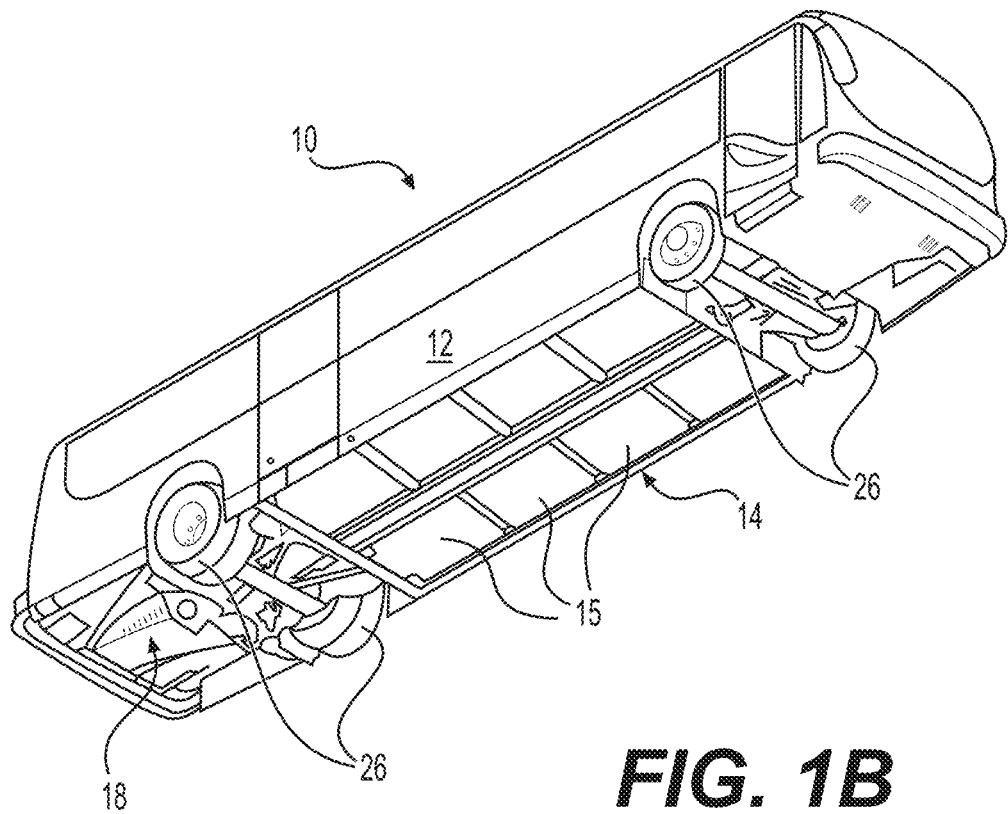

FIGS. 1A and 1B illustrate an electric vehicle (EV 10) in the form of an electric bus. As indicated above, although aspects of the current disclosure are described with reference to an electric bus, this is only exemplary. And in general, EV 10 may include any type of electric vehicle. FIG. 1A shows the top view of EV 10, and FIG. 1B shows the undercarriage of EV 10. In the discussion that follows, reference will be made to both FIGS. 1A and 1B. EV 10 may include a body 12 enclosing a space for passengers, for example, a passenger compartment or cabin 24. In some embodiments, some (or all) parts of body 12 may be fabricated using one or more composite materials to reduce the weight of EV 10. In some embodiments, EV 10 may be a low-floor electric bus. As is known in the art, in a low-floor bus, there are no stairs at the front and/or the back doors of the bus. In such a bus, the floor is positioned close to the road surface to ease entry and exit into the bus. In some embodiments, the floor height of the low-floor bus may be about 12-16 inches (30-40 centimeters) from the road surface. Body 12 of EV 10 may have any size, shape, and configuration.

EV 10 may include an electric motor 18 that generates power for propulsion of EV 10, for example, via wheels 26. One or more battery packs 15 of a battery system 14 may store electrical energy to power the electric motor 18 and other accessories. In one aspect, EV 10 includes additional components, such as an HVAC system 20 to cool the cabin 24, a radiator 22 to assist in cooling the heat producing components of EV 10, and power electronics 30, shown in FIGS. 2-6 (e.g., inverters, converters, internal and external lights, one or more controllers, one or more user interfaces, etc.). Although only one roof-mounted HVAC system 20 is shown in FIG. 1A, as discussed herein, EV 10 may include additional HVAC units, for example, coupled to a curb side and/or a street side of EV 10. As will be described later with reference to FIGS. 2-6, a refrigerant and/or a coolant may circulate between one or more of HVAC 20, radiator 22, heat exchangers, the heat producing components (such as, for example, motors, batteries, etc.), and other components to either heat or cool these components. Although a charging interface 16, a charge port 19, HVAC system 20, and radiator 22 are illustrated as being positioned at specific locations (e.g., on the roof, rear, etc.) of the EV 10, in general, these components may be positioned anywhere on EV 10.

In some embodiments, as illustrated in FIG. 1B, battery system 14 may be positioned under the floor of the EV 10. Battery system 14 may have a modular structure and may be configured as a plurality of battery packs 15. In some embodiments, each battery pack 15 may include a housing enclosing, among others, a plurality of battery modules, each having multiple battery cells. In some embodiments, battery packs 15 may be positioned in cavities located under the floor of the EV 10. In some embodiments, as illustrated in FIG. 1B, battery packs 15 may be arranged in two parallel columns under the floor. An exemplary structure and configuration of battery system 14 is described in U.S. Patent Application Publication No. US 2018/0205123, which is incorporated herein by reference in its entirety.

Although battery system 14 is illustrated and described as being positioned under the floor of EV 10, this is only exemplary. In some embodiments, some or all of battery packs 15 of battery system 14 may be positioned elsewhere on the EV 10. For example, some of battery packs 15 may be positioned on the roof of EV 10. As battery system 14 may have considerable weight, placing battery system 14 under the floor of EV 10 may assist in keeping the center of gravity lower and balance weight distribution, thus increasing drivability and safety. Additionally, as shown below in FIGS. 2-6, battery system 14 may be cooled or heated via liquid (e.g., a coolant) flowing through and/or around components of battery system 14.

The batteries of battery system 14 may have any chemistry and construction. In some embodiments, the batteries may be lithium titanate oxide (LTO) batteries. In some embodiments, the batteries may be nickel manganese cobalt (NMC) batteries. LTO batteries may be fast charge batteries that may allow EV 10 be recharged to substantially its full capacity in a small amount of time (e.g., about ten minutes or less). Due to its higher charge density, NMC batteries may take longer to charge to a comparable state of charge (SOC), but NMC batteries may retain a larger amount of charge and thus increase the range of EV 10. It is also contemplated that, in some embodiments, the batteries may include other or multiple different chemistries. For instance, some of the batteries may be LTO or NMC batteries, while other batteries may have another chemistry (for example, lead-acid, nickel cadmium, nickel metal hydride, lithium ion, zinc air, etc.). Some of the possible battery chemistries and arrangements in EV 10 are described in commonly assigned U.S. Pat. No. 8,453,773, which is incorporated herein by reference in its entirety.

In some embodiments, as illustrated in FIG. 1A, charging interface 16 may be provided on the roof of EV 10 to charge the batteries of battery system 14. Charging interface 16 may engage with a charging head of an external charging station (not shown) to charge the batteries of battery system 14. Details of the charging head and the interfacing of the charging head with charging interface 16 of EV 10 are described in commonly assigned U.S. Patent Application Publication Nos. US 2013/0193918 A1 and US 2014/0070767 A1, which are incorporated by reference in their entirety herein. Additionally or alternatively, in some embodiments, battery system 14 may be charged by connecting an external power supply to charge port 19 located, for example, on a side surface of EV 10. To charge battery system 14 through charge port 19, a connector carrying power from an external power supply may be plugged into charge port 19. In some embodiments, charge port 19 may be a standardized charge port (e.g., SAE J1772 charge port) that is configured to receive a corresponding standardized connector (e.g., SAE J1772 connector). Details of an exemplary charge port 19, and an exemplary method of using the charge port 19, are described in U.S. Pat. No. 9,669,719, which is incorporated by reference in their entirety herein.

Figure 2:
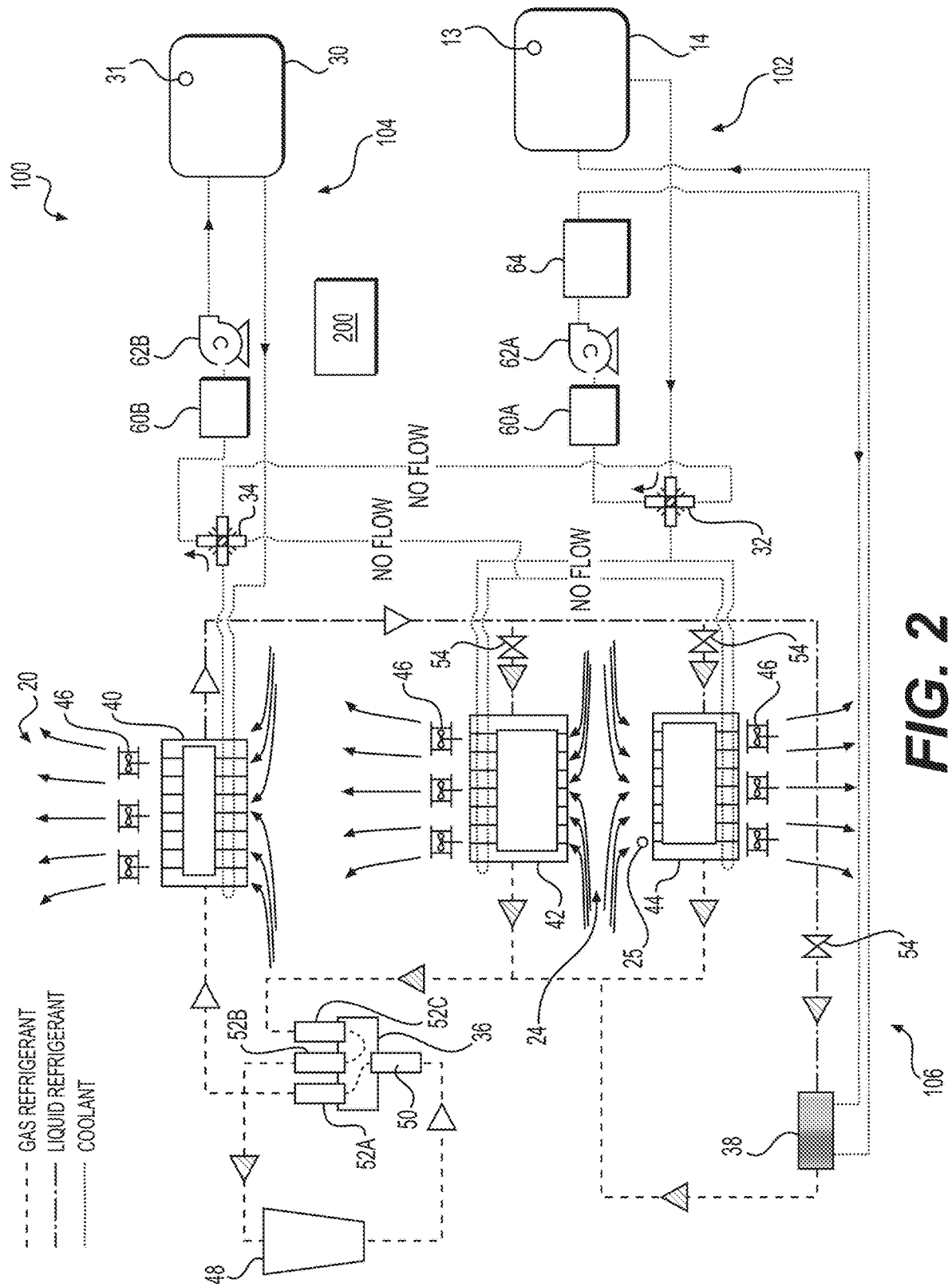
FIG. 2 illustrates an exemplary configuration of a temperature management system of the bus of FIGS. 1A and 1B.

FIG. 2 illustrates an exemplary configuration of a temperature regulation system 100 that may be incorporated on EV 10. Temperature regulation system 100 includes a battery temperature control system 102, a power electronics temperature control system 104, and a cabin temperature control system 106. Battery temperature control system 102, power electronics temperature control system 104, and cabin temperature control system 106 may help to manage, control, regulate temperatures of (i.e., heat or cool) one or more battery systems 14 that power EV 10, various power electronics 30 that help control and/or operate EV 10, and cabin 24 of EV 10. As shown in FIGS. 2-6, battery system 14, HVAC system 20, and power electronics 30 may be coupled to a plurality of fluid conduits (e.g., hoses, tubes, pipes, etc.), shown as dashed or dotted lines with arrows indicating fluid flow, along with a plurality of pumps and valves to direct temperature regulation fluid (e.g., coolant, refrigerant, water, etc.). Control values 32, 34 and reversing valve 36 may be configured to direct fluid flow through selected conduits of the plurality of conduits to selectively couple battery system 14, power electronics 30, and HVAC system 20 to efficiently heat or cool one or more of battery system 14, cabin 24 of EV 10, and power electronics 30. FIGS. 2-6 illustrate different configurations of control valves 32 and 34 and reversing valve 36 in order to selectively couple battery system 14, power electronics 30, and HVAC system 20. Specifically, FIGS. 2-6 illustrate different configurations of control valves 32 and 34 and reversing valve 36 in order to selectively direct refrigerant (either in a gaseous or liquid form) and coolant (e.g., a mixture of water and glycol) through system 100, with the arrows in FIGS. 2-6 indicating flow of the refrigerant and coolant.

As discussed above, battery system 14 may include a plurality of battery packs 15. Battery packs 15 may include internal chemistries that may react differently (e.g., have different impedances, power storage, and/or power charging or delivery capabilities) at different temperatures. Battery system 14 may be coupled to one or more fluid conduits in order to heat or cool battery system 14. For example, a battery temperature control system 102 may include a plurality of fluid conduits coupled to battery system 14. The flow of coolant through the fluid conduits and around battery system 14 is controlled by the configuration of one or more of control valves 32 and 34. The fluid conduits may also be coupled to a plate heat exchanger 38.

Power electronics 30 may be coupled to one or more fluid conduits in order to heat or cool power electronics 30. For example, a power electronics temperature control system 104 may include a plurality of fluid conduits coupled to power electronics 30. The flow of coolant through the fluid conduits and around power electronics is controlled by the configuration of one or more of control valves 32 and 34.

HVAC system 20 may be coupled to one or more fluid conduits in order to heat or cool the cabin of EV 10. For example, cabin temperature control system 106 may include a plurality of fluid conduits coupled to a plurality of heat exchangers, including HVAC system 20. The flow of one or more refrigerants through the fluid conduits and the heat exchangers is controlled by the configuration of reversing valve 36.

For example, HVAC system 20 and cabin temperature control system 106 may include one or more exterior or outside air heat exchangers 40. In some embodiments, outside air heat exchanger 40 may be positioned on the roof of EV 10 (e.g. within HVAC 20). Cabin temperature control system 106 also includes one or more interior or inside air heat exchangers. In one aspect, cabin temperature control system 106 includes a curb side inside air heat exchanger 42 and a street side inside air heat exchanger 44. Outside air heat exchanger 40 and inside air heat exchangers 42, 44 may be coupled to various fluid conduits to receive and deliver a refrigerant and/or a coolant to heat or cool the refrigerant and/or the coolant. Outside air heat exchanger 40 and inside air heat exchangers 42, 44 may receive air, either ambient air from outside EV 10 or air from within cabin 24 of EV 10, such that the received air is either heated or cooled via thermal interaction with the refrigerant and/or the coolant. The heated or cooled air may then be output, either to outside EV 10 or to cabin 24 of EV 10. The flow of air may be controlled by one or more fluid pumps, for example, fans 46. Although not shown, the direction of fans 46 may be reversed in order to control the heating or cooling direction of heat exchangers 40, 42, and 44.

In some embodiments, heat exchangers 40, 42, and 44 may be plate heat exchangers. As would be recognized by a person skilled in the art, a plate heat exchanger is a type of heat exchanger that uses metal plates to transfer heat between two fluids. While a plate heat exchanger offers high heat transfer efficiency, a plate heat exchanger is not a requirement. And, in general, heat exchangers 40, 42, 44 may be any type of heat exchanger (shell and tube heat exchangers, double pipe heat exchangers, condensers, evaporators, etc.) that is configured to transfer heat between two fluids. In some embodiments, heat exchangers 40, 42, and 44 may be chiller plates. Alternatively, heat exchangers 40, 42, and 44 may be printed circuit heat exchangers, finned tube heat exchangers, rotary heat exchangers, etc.

In some embodiments, control valves 32 and 34 and reversing valve 36 may be controlled by one or more solenoids, and may be coupled (e.g., wired or wirelessly connected) to a controller 200 and/or to a user interface, for example, within cabin 24 of EV 10. The controller 200 and/or user interface may automatically control the operation of control valves 32 and 34 and reversing valve 36 based on sensed information (e.g., ambient temperature, cabin temperature from sensor 25, battery system temperature from sensor 13, power electronics temperature from sensor 31, load on electric motor, etc.). Alternatively, an operator may control the configurations of control valves 32 and 34 and reversing valve 36 (e.g., via the user interface) based on determined operating conditions or performance characteristics.

Control valves 32 and 34 may be four-way valves. Control valve 32 may control the flow of coolant relative to, at least, the one or more battery packs 15 (FIG. 1B) within battery system 14. Control valve 34 may control the flow of coolant relative to, at least, power electronics 30. Reversing valve 36 controls the flow of refrigerant. Reversing valve 36 may be coupled to a compressor 48. Reversing valve 36 may include an inlet 50 to receive high temperature, high pressure gas refrigerant from compressor 48. Reversing valve 36 may also include three fluid ports 52A, 52B, and 52C. Reversing valve 36 includes internal connections to control the flow of refrigerant through inlet 50 and fluid ports 52A, 52B, and 52C. The internal connections may control the flow of the high temperature, high pressure gas refrigerant and may also control the flow of a low temperature, low pressure gas refrigerant. Moreover, the flow of refrigerant and coolant may also be controlled by one or more secondary valves 54. Secondary valves 54 may be expansion valves or may be controlled by one or more solenoids. Secondary valves 54 may be positioned adjacent to curb side inside air heat exchanger 42 and street side inside heat exchanger 44. One secondary valve 54 may also be positioned adjacent to plate heat exchanger 38. Secondary valves 54 may be upstream or downstream of one or more heat exchangers, and the relative position may depend on the flow of fluid, for example, whether temperature regulation system 100 is in a heating or cooling mode.

FIG. 2 illustrates a configuration in which battery temperature control system 102, power electronics temperature control system 104, and cabin temperature control system 106 are substantially independent and thermally isolated from one another. As shown, control valves 32 and 34 are in circulation positions. In this aspect, battery system 14 may be cooled via coolant being pumped from battery system 14 and passing through control valve 32, an expansion tank 60A, a pump 62A, a heater, for example, a water heater 64, plate heat exchanger 38, and back to battery system 14. The coolant may thermally interact (e.g., transfer heat) with refrigerant in plate heat exchanger 38 to cool the coolant, and thus cool battery system 14. Power electronics 30 may be cooled using outside air heat exchanger 40 (e.g., acting as a radiator for coolant and acting as a condenser for refrigerant). In this aspect, power electronics 30 may be cooled via coolant being pumped from power electronics 30 and passing through outside air heat exchanger 40, control valve 34, expansion tank 60B, pump 62B, and back to power electronics 30. Moreover, in this aspect, the coolant within power electronics temperature control system 104 does not thermally interact and/or intermix with coolant within battery temperature control system 102.

Furthermore, in this configuration, the ambient temperature may be high and cabin 24 may be cooled using refrigerant passing through curb side inside air heat exchanger 42 and through street side inside air heat exchanger 44. In this aspect, cabin temperature control system 106 and reversing valve 36 are in a cooling mode. The cooling mode may be used when the ambient temperature or temperature inside cabin 24 is warmer than a desired temperature. As shown in FIG. 2, compressor 48 may deliver high temperature, high pressure gas refrigerant to inlet 50. Reversing valve 36 may direct the high temperature, high pressure gas refrigerant to outside air heat exchanger 40. The refrigerant may cool within outside air heat exchanger 40 (e.g., due to interaction with ambient air) such that high temperature, high pressure liquid refrigerant is output from air heat exchanger 40. In this aspect, outside air heat exchanger 40 may receive ambient air that is approximately 90 degrees Fahrenheit, and outside air heat exchanger 40 may output air that is approximately 110 degrees Fahrenheit. The high temperature, high pressure liquid may then be directed toward plate heat exchanger 38. Secondary valve 54 may allow the refrigerant to expand and/or cool such that low temperature, low pressure liquid refrigerant is delivered to plate heat exchanger 38. Plate heat exchanger 38 may heat the refrigerant (i.e., due to thermal interaction with coolant in battery temperature control system 102) such that low temperature, low pressure gas refrigerant is delivered back toward reversing valve 36. Reversing valve 36 may direct the gas refrigerant toward compressor 48, which may continue the refrigerant loop to cool the cabin.

Additionally, as shown in FIG. 2, the high temperature, high pressure liquid refrigerant may cool and pass through secondary valves 54 as low temperature, low pressure liquid refrigerant. The low temperature, low pressure liquid refrigerant may be delivered to curb side inside air heat exchanger 42 and street side inside air heat exchanger 44. The liquid refrigerant may interact with warm cabin air within curb side inside air heat exchanger 42 and street side inside air heat exchanger 44. Curb side inside air heat exchanger 42 and street side inside air heat exchanger 44 may each output low temperature, low pressure gas refrigerant toward reversing valve 36. Furthermore, curb side inside air heat exchanger 42 and street side inside air heat exchanger may output cold return air back into cabin 24. For example, curb side inside air heat exchanger 42 and street side inside air heat exchanger 44 may receive cabin air that is approximately 80 degrees Fahrenheit, and curb side inside air heat exchanger 42 and street side inside air heat exchanger 44 may output return air that is approximately 45 degrees Fahrenheit back into cabin 24. The low temperature, low pressure gas refrigerant may then mix with the low temperature low pressure gas refrigerant from plate heat exchanger 38 and be delivered back to fluid port 52C of reversing valve 36. Reversing valve 36 may transmit the low temperature, low pressure gas refrigerant to compressor 48, for example, via fluid port 52B, and compressor 48 may output high temperature, high pressure gas refrigerant, as discussed above.

Figure 3:
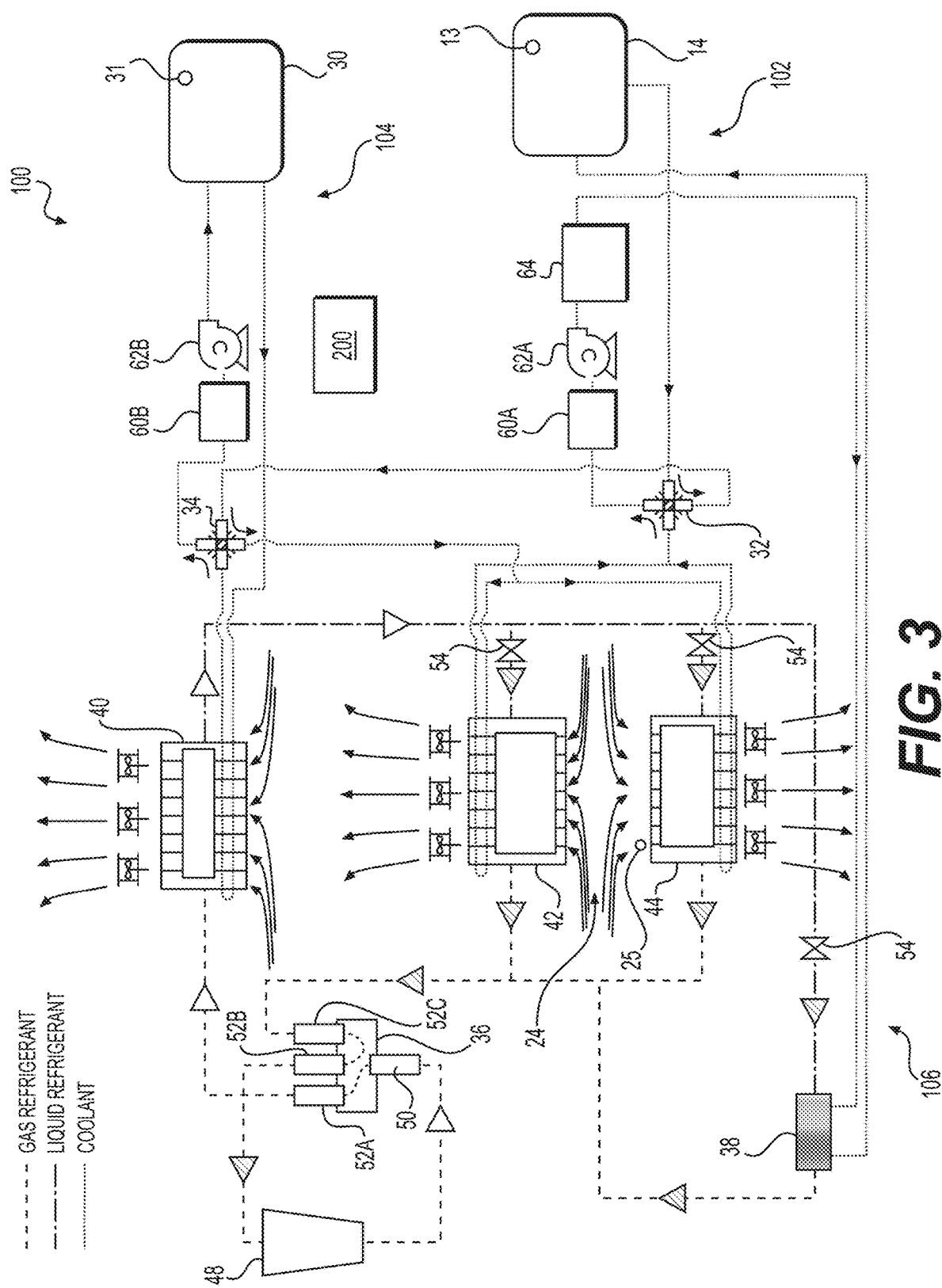
FIG. 3 illustrates another exemplary configuration of the temperature management system of the bus of FIGS. 1A and 1B.

FIG. 3 illustrates another configuration of battery temperature control system 102, power electronics temperature control system 104, and cabin temperature control system 106. In the configuration shown in FIG. 3, battery temperature control system 102, power electronics temperature control system 104, and cabin temperature control system 106 are used to cool the respective components of EV 10. As shown, control valves 32 and 34 are in redirection positions. In this aspect, battery system 14 may be cooled via coolant being pumped from battery system 14 and passing through control valve 32, expansion tank 60A, pump 62A, water heater 64, plate heat exchanger 38, and back to battery system 14, as discussed above. In addition, battery system 14 may be cooled by coolant being pumped through one or more of curb side inside air heat exchanger 42 and street side inside air heat exchanger 44. As shown in FIG. 3, coolant may be pumped from battery system 14 to control valve 32. Control valve 32 may direct the coolant toward control valve 34. Control valve 34 may then direct the coolant to one or more of curb side inside air heat exchanger 42 and street side inside air heat exchanger 44. The coolant may be cooled within one or more of curb side inside air heat exchanger 42 and street side inside air heat exchanger 44, and may then be pumped back through control valve 32, expansion tank 60A, pump 62A, and water heater 64. Before being delivered back to battery system 14, the coolant may further pass through plate heat exchanger 38 such that the cooled coolant may be further cooled by thermally interacting with refrigerant before being delivered to battery system 14.

Power electronics 30 may be cooled using outside air heat exchanger 40 by coolant being pumped from power electronics 30 and passing through outside air heat exchanger 40, control valve 34, expansion tank 60B, pump 62B, and back to power electronics 30, as discussed above with respect to FIG. 2. Similarly, cabin 24 may be cooled using refrigerant passing through curb side inside air heat exchanger 42 and through street side inside air heat exchanger 44 with cabin temperature control system 106 and reversing valve 36 being in a cooling mode, as discussed above with respect to FIG. 2. Moreover, in this aspect, the coolant within power electronics temperature control system 104 does not thermally interact and/or intermix with coolant within battery temperature control system 102.

The redirection positions of control valves 32 and 34 allow for battery system 14 to be cooled using both the plate heat exchanger 38 as well as one or more of curb side inside air heat exchanger 42 and street side inside air heat exchanger 44. That is, in one mode the battery system 14 may be cooled using only the plate heat exchanger 38 (FIG. 2), and in another cooling mode the battery system 14 may be cooled by both the plate heat exchanger 38 and one or both of the curb side and street side inside air heat exchangers 42, 44 (FIG. 3). For example, in the configuration shown in FIG. 3, the cooled cabin air may be used to further cool the coolant being directed to battery system 14. In this manner, battery system 14 may be cooled more quickly and/or to a lower temperature than the configuration shown in FIG. 2 by changing the direction positions of control valves 32 and 34. For example, cooling battery system 14 more quickly and/or to a lower temperature may be useful in a hot climate, when EV 10 is operating under stressful conditions (heavy passenger/cargo load, steep road grade, etc.), during charging, during fast charging (e.g., charging at a high rate), based on chemistry of battery system 14, etc. Additionally, although not shown, the redirection positions of control valves 32 and 34 allow for battery system 14 to be cooled using only one or more of curb side inside air heat exchanger 42 and street side inside air heat exchanger 44. In some embodiments, an electronic controller (e.g., controller 200, etc.) may switch between the cooling modes of battery system 14 based on detected operating conditions (e.g., when sensor 13 indicates that battery temperature exceeds a predetermined value, etc.). In some embodiments, the driver (or another user of EV 10) may switch between the two different cooling modes based on need (e.g., during charging, etc.).

Figure 4:
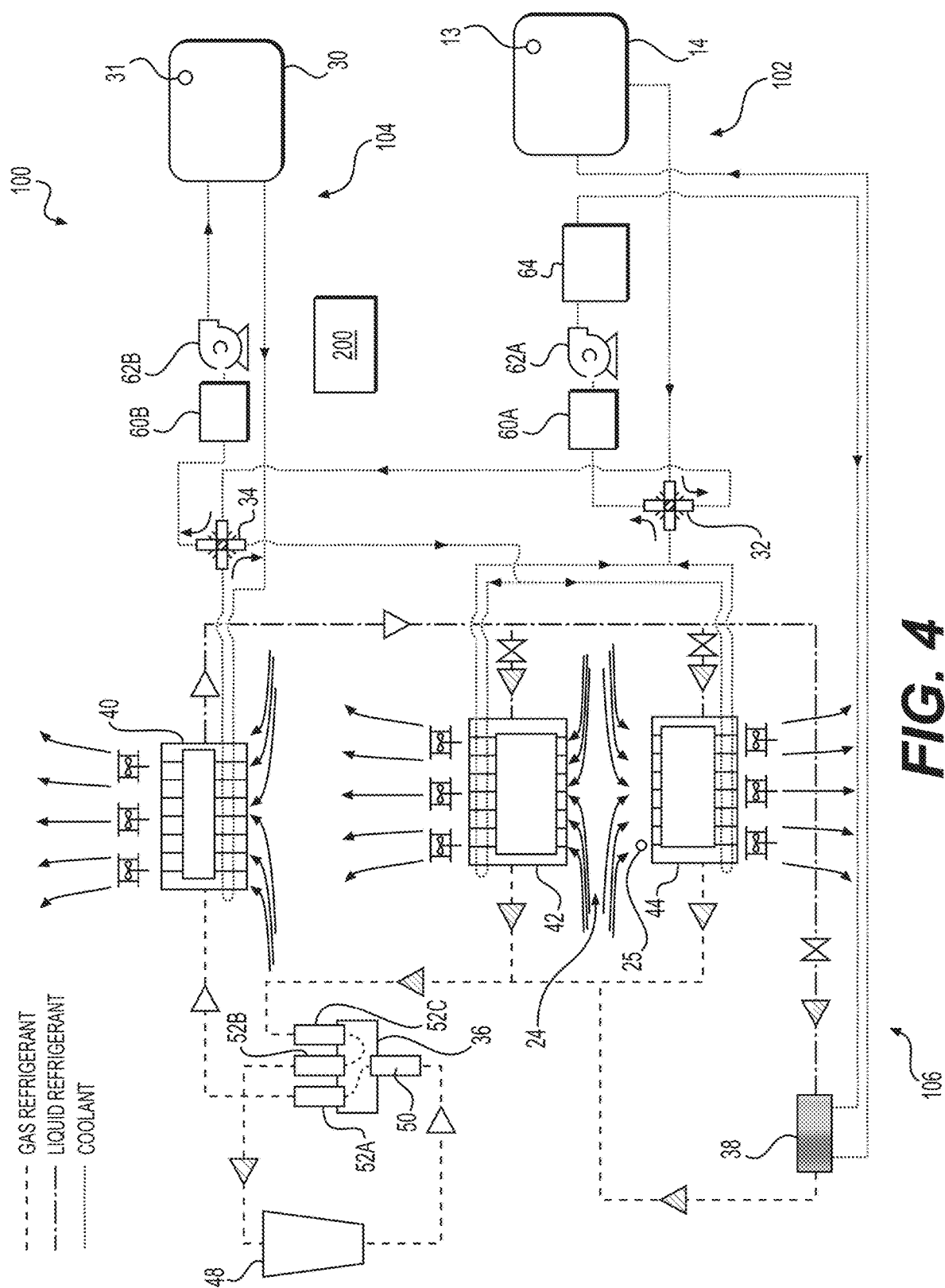
FIG. 4 illustrates a further exemplary configuration of a temperature management system of the bus of FIGS. 1A and 1B.

FIG. 4 illustrates another configuration of battery temperature control system 102, power electronics temperature control system 104, and cabin temperature control system 106. In the configuration shown in FIG. 4, battery temperature control system 102, power electronics temperature control system 104, and cabin temperature control system 106 are used to cool the respective components of EV 10, as discussed above with respect to FIGS. 2 and 3. As in both FIGS. 2 and 3, cabin temperature control system 106 is used to cool cabin 24. For example, cabin 24 may be cooled using refrigerant passing through curb side inside air heat exchanger 42 and through street side inside air heat exchanger 44 with cabin temperature control system 106 and reversing valve 36 being in a cooling mode, as discussed above with respect to FIGS. 2 and 3.

Furthermore, battery temperature control system 102 and power electronics temperature control system 104 may be coupled in series. As shown in FIG. 4, control valves 32 and 34 may be in redirection positions. Control valve 32 may be in the same position as in FIG. 3, and control valve 34 may be in an opposite position as in FIG. 3. In this aspect, battery system 14 may be cooled via coolant being pumped from battery system 14 and passing through control valve 32, expansion tank 60A, pump 62A, water heater 64, plate heat exchanger 38, and back to battery system 14, as discussed above. In addition, battery system 14 may be cooled by coolant being directed through one or more of curb side inside air heat exchanger 42 and street side inside air heat exchanger 44.

However, as shown in FIG. 4, the coolant may be directed from battery system 14 to control valve 32. Control valve 32 may direct the coolant toward control valve 34. Control valve 34 may then direct the coolant to expansion tank 60B and pump 62B before being delivered to power electronics 30. The coolant may cool power electronics 30 and be output toward outside air heat exchanger 40. The coolant may be cooled by outside air heat exchanger 40 and be directed back to control valve 34. Control valve 34 may then direct the coolant toward one or more of curb side inside air heat exchanger 42 and street side inside air heat exchanger 44. The coolant may be cooled within one or more of curb side inside air heat exchanger 42 and street side inside air heat exchanger 44, and may then be directed back through control valve 32, expansion tank 60A, pump 62A, and water heater 64. Before being delivered back to battery system 14, the coolant may further pass through plate heat exchanger 38 such that the cooled coolant may be further cooled by thermally interacting with refrigerant before being delivered to battery system 14. Then, the coolant may be delivered through control valves 32 and 34 and other system components to further cool power electronics 30. In this aspect, the coolant within power electronics temperature control system 104 thermally interacts and intermixes with coolant within battery temperature control system 102.

The redirection positions of control valves 32 and 34 allow for battery system 14 and power electronics 30 to be fluidly connected in series. Accordingly, battery system 14 and power electronics 30 may both be cooled using plate heat exchanger 38, outside air heat exchanger 40, and one or more of curb side inside air heat exchanger 42 and street side inside air heat exchanger 44. That is, in one cooling mode battery system 14 may be cooled using only the plate heat exchanger 38, and power electronics system 30 may be cooled using only outside air heat exchanger 40. In another cooling mode battery system 14 and power electronic system 30 may be cooled by plate heat exchanger 38, outside air heat exchanger 40, and one or both of the curb side and street side inside air heat exchangers 42, 44. In this manner, battery system 14 and power electronics 30 may be cooled more quickly and/or to a lower temperature than the configuration shown in FIGS. 2 and 3 by changing the direction positions of control valves 32 and 34. For example, cooling battery system 14 and power electronics 30 more quickly and/or to a lower temperature may be useful in a very hot climate, when EV 10 is operating under very stressful conditions (as described above with reference to FIG. 3), depending on the internal chemistry of battery system 14, number and/or size of power electronics 30, etc.

Additionally, the configuration shown in FIG. 4 may be used when battery system 14 is not in need of cooling, for example, when battery system 14 is cooler than power electronics 30. In this aspect, the configurations of battery temperature control system 102, power electronics temperature control system 104, and cabin temperature control system 106 may allow battery system 14 and the coolant within battery temperature control system 102 to help cool power electronics 30 and the coolant within power electronics temperature control system 104. Furthermore, as mentioned above, an electronic controller (e.g., controller 200, etc.) may switch between the cooling modes of battery system 14 based on detected operating conditions (e.g., when sensor 13 indicates that battery temperature exceeds a predetermined value, etc.). In some embodiments, the driver (or another user of EV 10) may switch between the two different cooling modes based on need (e.g., during charging, etc.).

Figure 5:
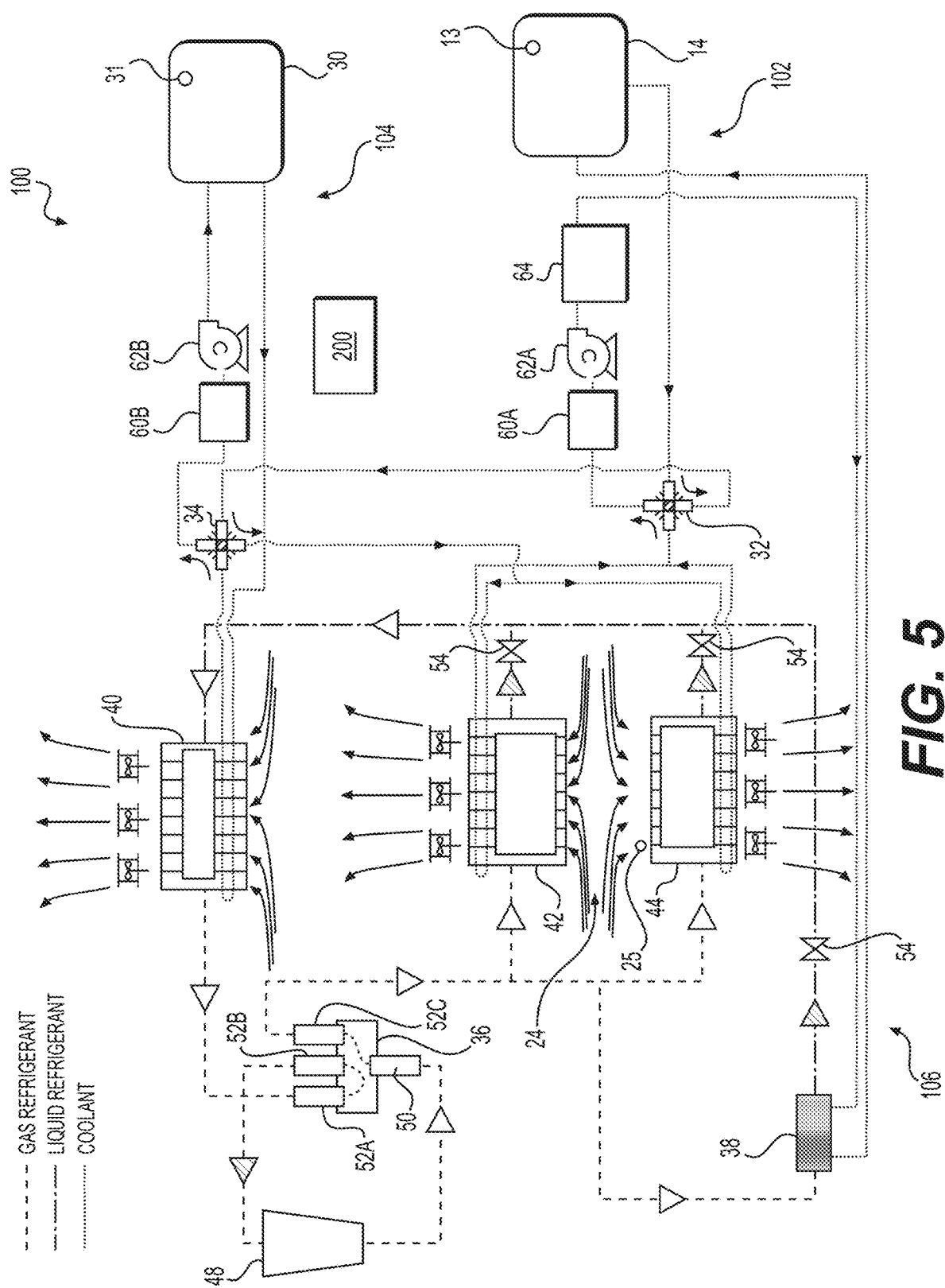
FIG. 5 illustrates yet another exemplary configuration of a temperature management system of the bus of FIGS. 1A and 1B.
Figure 6:
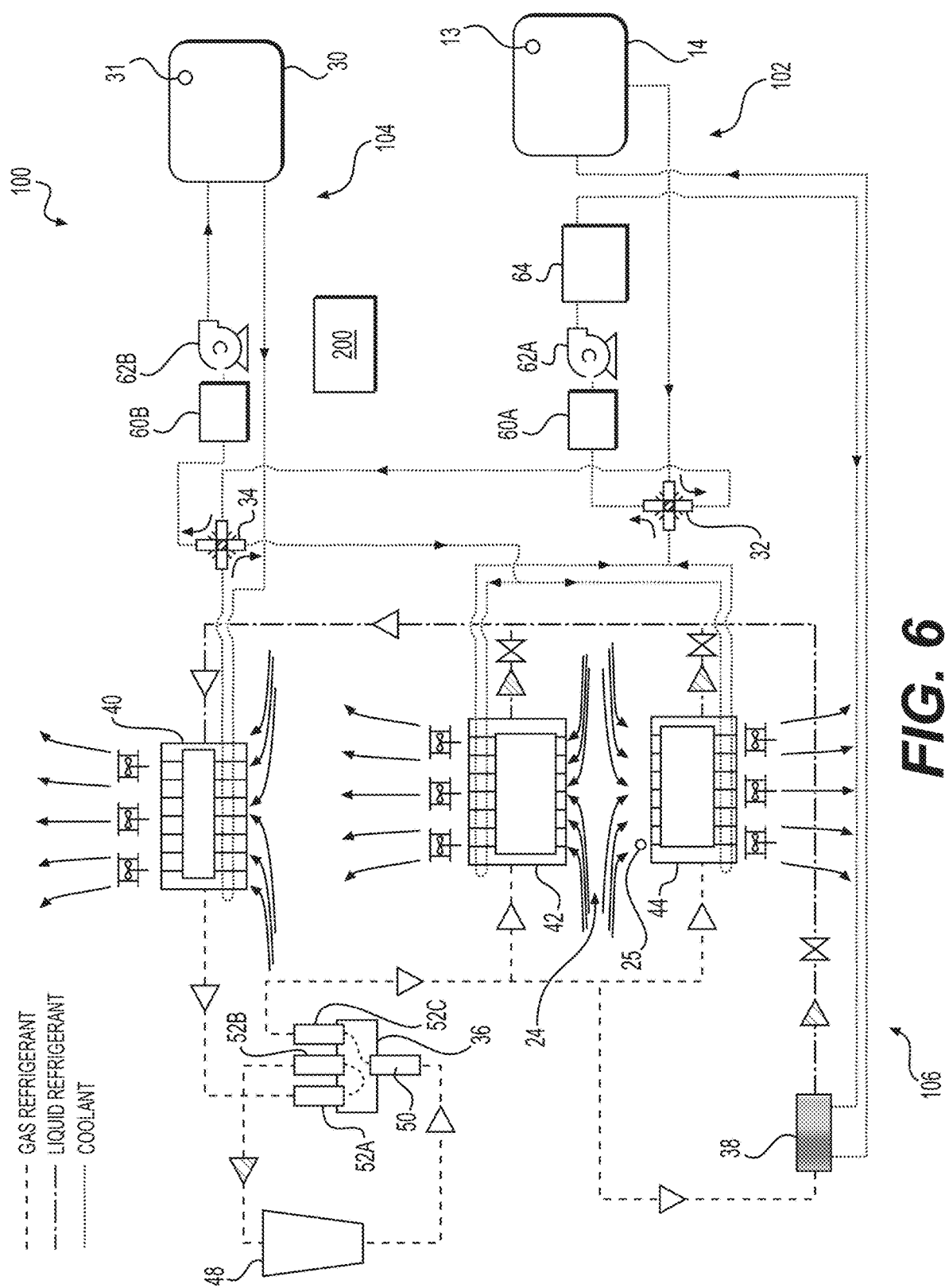
FIG. 6 illustrates another exemplary configuration of a temperature management system of the bus of FIGS. 1A and 1B.

FIGS. 5 and 6 illustrate cabin temperature control system 106 and reversing valve 36 operating in a cabin heating mode. In this configuration, cabin 24 may be heated using refrigerant passing through curb side inside air heat exchanger 42 and through street side inside air heat exchanger 44. In this aspect, cabin temperature control system 106 and reversing valve 36 are in a heating mode. Heating mode may be used when the ambient temperature or temperature inside cabin 24 is cooler than a desired temperature.

As shown in FIG. 5, compressor 48 may deliver high temperature, high pressure gas refrigerant to inlet 50. Reversing valve 36 may direct the high temperature, high pressure gas refrigerant to inside air heat exchangers 42 and 44 and to plate heat exchanger 38. The refrigerant may cool within inside air heat exchanger 42 and 44 (e.g., due to interaction with cool cabin) such that low temperature, high pressure liquid refrigerant is output from inside air heat exchangers 42 and 44. Inside air heat exchangers 42 and 44 may intake cool air from cabin 24, and may also output warm return air back into cabin 24. For example, inside air heat exchangers 42 and 44 may receive cabin air that is approximately 60 degrees Fahrenheit, and inside air heat exchangers 42 and 44 may output return air that is approximately 70 degrees Fahrenheit back into cabin 24. The low temperature, high pressure liquid refrigerant may then pass through secondary valves 54 and may be delivered toward outside air heat exchanger 40. The low temperature, low pressure liquid refrigerant may be heated by outside air heat exchanger 40 (e.g., due to thermal interaction with cool ambient air). Outside air heat exchanger 40 may output low temperature, low pressure gas refrigerant, which may be delivered to fluid port 52A. Outside air heat exchanger 40 may intake cool ambient air, and may also output cold air to the exterior of EV 10. For example, outside air heat exchanger 40 may receive ambient air that is approximately 40 degrees Fahrenheit, and outside air heat exchanger 40 may output air that is approximately 20 degrees Fahrenheit. Reversing valve 36 may direct the gas refrigerant back out of fluid port 52B as low temperature, low pressure gas refrigerant and towards compressor 48. For example, the gas refrigerant may decrease in pressure slightly as it passes through reversing valve 36, but the gas refrigerant does not decrease in pressure significantly enough to cause the refrigerant to substantially cool or become liquid. Compressor 48 may then output high temperature, high pressure gas refrigerant, which reversing valve 36 may direct toward inside air heat exchangers 42 and 44 and toward plate heat exchanger 38, as discussed above.

With respect to the portion of the high temperature, high pressure gas refrigerant that is directed toward plate heat exchanger 38, the gas refrigerant may cool within plate heat exchanger (i.e., due to thermal interaction with coolant in battery temperature control system 102) such that low temperature, low pressure gas refrigerant is output from plate heat exchanger 38. The low temperature, low pressure gas refrigerant may pass through a secondary valve 54 and cool to a low temperature, low pressure liquid refrigerant. The low temperature, low pressure liquid refrigerant may mix with the low temperature, low pressure liquid refrigerant output from inside air heat exchangers 42 and 44, and may be delivered through outside air heat exchanger 40 and reversing valve 36 to compressor 48, as discussed above.

Although not shown, it is noted that system 100 may include a configuration similar to the thermally isolated configuration of FIG. 2, but with cabin temperature control system 106 in the heating mode. In such a configuration, the refrigerant of cabin temperature control system 106 may be used to heat the cabin 24, as discussed above. Furthermore, battery temperature control system 102 may heat battery system 14 by controlling the flow of coolant through plate heat exchanger 38, and power electronics temperature control system 104 may control a temperature of power electronics 30 by controlling the flow of coolant through outside air heat exchanger 40.

FIG. 5 illustrates another temperature control configuration of battery temperature control system 102, power electronics temperature control system 104, and cabin temperature control system 106. In the configuration shown in FIG. 5, battery temperature control system 102, power electronics temperature control system 104, and cabin temperature control system 106 are used to control the temperature of the respective components of EV 10, as discussed above with respect to FIG. 2, and are not thermally isolated, similar to the configuration of FIG. 3. As shown, control valves 32 and 34 are in redirection positions. Battery system 14 may be heated via coolant being pumped from battery system 14 and passing through control valve 32, expansion tank 60A, pump 62A, water heater 64, plate heat exchanger 38, and back to battery system 14. In this aspect, water heater 64 may be activated to further heat the coolant. In addition, battery system 14 may be heated by coolant being pumped through one or more of curb side inside air heat exchanger 42 and street side inside air heat exchanger 44. As shown in FIG. 5, coolant may be pumped from battery system 14 to control valve 32. Control valve 32 may direct the coolant toward control valve 34. Control valve 34 may then direct the coolant to one or more of curb side inside air heat exchanger 42 and street side inside air heat exchanger 44. The coolant may be heated within one or more of curb side inside air heat exchanger 42 and street side inside air heat exchanger 44, and may then by pumped back through control valve 32, expansion tank 60A, pump 62A, and water heater 64. Before being delivered back to battery system 14, the coolant may further pass through plate heat exchanger 38 such that the heated coolant may be further heated before being delivered to battery system 14.

As in FIGS. 2 and 3, a temperature of power electronics 30 may be controlled (e.g., heated or cooled) using outside air heat exchanger 40 by coolant being pumped from power electronics 30 and passing through outside air heat exchanger 40, control valve 34, expansion tank 60B, pump 62B, and back to power electronics 30. Even though cabin temperature control system 106 is in heating mode, power electronics temperature control system 104 may cool power electronics 30. For example, power electronics 30 may experience higher temperatures than battery system 14 or other components of EV 10 due to the number of power electronics 30 and/or a load on the power electronics 30 of an electric bus. In this manner, the coolant passing from power electronics 30 to outside air heat exchanger 40 may still cool power electronics 30 in a situation where the power electronics 30 are at a higher temperature than the ambient air and/or the high temperature, high pressure liquid refrigerant.

Moreover, cabin 24 may be heated using refrigerant passing through curb side inside air heat exchanger 42 and through street side inside air heat exchanger 44 with cabin temperature control system 106 and reversing valve 36 being in a heating mode, as discussed above.

The redirection positions of control valves 32 and 34 allow for battery system 14 to be heated using both the plate heat exchanger 38 as well as one or more of curb side inside air heat exchanger 42 and street side inside air heat exchanger 44. In this manner, battery system 14 may be heated more quickly and/or to a higher temperature than the configuration discussed above by changing the direction positions of control valves 32 and 34. For example, heating battery system 14 more quickly and/or to a lower temperature may be useful in a cold climate, operating conditions of EV 10, depending on the internal chemistry of battery system 14, etc. Additionally, if battery system 14 is warm (e.g., 60 degrees Fahrenheit or warmer), coolant in battery temperature control system 102 may be warmed and may help heat cabin 24. In one instance, battery system 14 may be warm during heavy operating conditions or during a charging event, and thus coolant in battery temperature control system 102 may interact with cabin air in one or more of curb side inside air heat exchanger 42 and street side inside air heat exchanger 44 to help warm cabin air.

FIG. 6 illustrates another configuration of battery temperature control system 102, power electronics temperature control system 104, and cabin temperature control system 106. In the configuration shown in FIG. 6, battery temperature control system 102, power electronics temperature control system 104, and cabin temperature control system 106 are used to control the temperatures of the respective components of EV 10, as discussed above with respect to FIG. 5. Cabin temperature control system 106 is used to heat cabin 24. For example, cabin 24 may be heated using refrigerant passing through curb side inside air heat exchanger 42 and through street side inside air heat exchanger 44 with cabin temperature control system 106 and reversing valve 36 being in a heating mode, as discussed above with respect to FIG. 5.

Furthermore, battery temperature control system 102 and power electronics temperature control system 104 may be coupled in series, similar to the configuration of FIG. 4. As shown in FIG. 6, control valves 32 and 34 may be in redirection positions. Control valve 32 may be in the same position as in FIG. 5, and control valve 34 may be in an opposite position as in FIG. 5. Battery system 14 may be heated via coolant being pumped from battery system 14 and passing through control valve 32, expansion tank 60A, pump 62A, water heater 64, plate heat exchanger 38, and back to battery system 14, as discussed above. In this aspect, water heater 64 may be activated to further heat the coolant. In addition, battery system 14 may be heated by coolant being pumped through one or more of curb side inside air heat exchanger 42 and street side inside air heat exchanger 44. However, as shown in FIG. 6, coolant may be pumped from battery system 14 to control valve 32, and control valve 32 may direct the coolant toward control valve 34. In this manner, ambient air may be preheated, which may allow for various components of EV 10 (e.g., one or more heat pumps) to operate at low ambient temperatures.

Control valve 34 may then direct the coolant to expansion tank 60B and pump 62B before being delivered to power electronics 30. The coolant may help control the temperature of power electronics 30 and may be output toward outside air heat exchanger 40. The coolant may be heated by outside air heat exchanger and be directed back to control valve 34. Control valve 34 may then direct the coolant toward one or more of curb side inside air heat exchanger 42 and street side inside air heat exchanger 44. The coolant may be heated within one or more of curb side inside air heat exchanger 42 and street side inside air heat exchanger 44, and may then by pumped back through control valve 32, expansion tank 60A, pump 62A, and water heater 64. Before being delivered back to battery system 14, the coolant may further pass through plate heat exchanger 38 such that the heated coolant may be further heated before being delivered to battery system 14. Then, the coolant may be delivered through control valves 32 and 34 and other system components to further control the temperature of power electronics 30.

The redirection positions of control valves 32 and 34 allow for battery system 14 and power electronics 30 to be fluidly connected in series. Accordingly, the temperatures of battery system 14 and power electronics 30 may both be controlled using plate heat exchanger 38, outside air heat exchanger 40, and one or more of curb side inside air heat exchanger 42 and street side inside air heat exchanger 44. In this manner, the temperatures of battery system 14 and power electronics 30 may be controlled more quickly and/or to a higher temperature than the configuration shown in FIG. 5 by changing the direction positions of control valves 32 and 34. For example, controlling the temperatures of battery system 14 and power electronics 30 more quickly and/or to a higher temperature may be useful in a very cold climate, operating conditions of EV 10, depending on the internal chemistry of battery system 14, number and/or size of power electronics 30, etc.

As mentioned above, even though battery temperature control system 102 and cabin temperature control system 106 are in heating modes, power electronics temperature control system 104 may cool power electronics 30. For example, power electronics 30 may experience higher temperatures than battery system 14 or other components of EV 10 due to the number of power electronics 30 and/or a load on the power electronics 30 of an electric bus. In this manner, the coolant passing from power electronics 30 to outside air heat exchanger 40, inside air heat exchangers 42 and 44, plate heat exchanger 38, water heater 64, and battery system 14 may cool power electronics 30 in a situation where the power electronics 30 are at a higher temperature than the ambient air, air within cabin 24, the coolant, and/or the high temperature, high pressure liquid refrigerant. Similarly, the coolant passing from power electronics 30 to outside air heat exchanger 40, inside air heat exchangers 42 and 44, plate heat exchanger 38, water heater 64, and battery system 14 may help heat battery system 14 and/or cabin 24 in the situation where the power electronics 30 are at a higher temperature than the ambient air, air within cabin 24, the coolant, and/or the high temperature, high pressure liquid refrigerant.

Furthermore, it is noted that water heater 64 may be inactive in cooling modes discussed with respect to FIGS. 2-4. Nevertheless, water heater 64 may be activated when operating in a heating mode, as discussed with respect to FIGS. 5 and 6. Water heater 64 may be used to heat battery system 14. For example, water heater 64 may be an electric water heater or other heat source. Water heater 64 may also further heat coolant, and act as a heating boost for compressor 48, for example, due to the thermal interaction between the coolant and the refrigerant. In this aspect, water heater 64 may be used to help heat cabin 24.

It is noted that while both curb side inside air heat exchanger 42 and street side inside air heat exchanger 44 are shown in FIGS. 2-6, this disclosure is not so limited. In one aspect, the system 100 may operate in a similar manner to as discussed above with a single inside air heat exchanger. In some embodiments, additional insider heat exchangers (e.g., similar to curb side inside air heat exchanger 42 and/or street side inside air heat exchanger 44) may be provided in cabin 24 and coupled to the cooling system like heat exchangers 42, 44.

The connections shown in FIGS. 2-6 allow for changing configurations of control valves 32 and 34 and reversing valve 36 controls the various cooling and heating configurations discussed above. In this aspect, battery temperature control system 102, power electronics temperature control system 104, and cabin temperature control system 106 may be selectively thermally coupled or isolated depending on the desired heating or cooling situation. For example, the configuration shown in FIG. 2 may be used when the ambient temperature is higher than the temperature of battery system 14 and when cooling of battery system 14 is required. The configuration shown in FIG. 3 may be implemented when the ambient temperature is lower than the temperature of battery system 14 and when cooling of battery system 14 is required. The configuration shown in FIG. 4 may be used when simultaneous cooling of battery system 14 and of power electronics 30 is required. The configuration of FIG. 4 may allow for cooling power electronics 30 below the ambient temperature and/or for quickly cooling power electronics 30 (e.g., when a motor is in a high power mode to power EV 10 on a steep climb and/or in very hot ambient temperatures). The configuration shown in FIG. 5 may be implemented when the ambient temperature is lower than the temperature of battery system 14 and when heating battery system 14 and cooling of power electronics 30 is required. Furthermore, the configuration shown in FIG. 6 may be used when the ambient temperature is much lower (e.g., extremely cold ambient temperatures) than the temperature of battery system 14 and when heating of both battery system 14 and power electronics 30 is required. The configuration of FIG. 6 may provide for a preheating of ambient air to allow for operation of various components (e.g., a heat pump) at low ambient temperatures.

The disclosed examples allow for a plurality of heat exchangers and multiple fluids (e.g., a refrigerant and a coolant) in respective closed-loop vapor compressor cycles to exchange heat. Controller 200 of temperature regulation system 100 may increase or decrease the cooling or heating of cabin 24, battery system 14, and power electronics 30. In some embodiments, controller 200 may increase the cooling of battery system 14 when a temperature of the battery system 14 (e.g., detected by sensor 13) increases above a threshold. In some embodiments, controller 200 may increase the cooling (or heating) of the battery packs 15 of battery system 14 in anticipation of a charging event. For example, controller 200 may heat or cool the batteries (e.g., by selecting a desired heating/cooling mode) before (e.g., a predetermined time before, when driving towards a charging station, based on GPS location, etc.) a charging event to increase charge acceptance during charging. In embodiments, where the battery system 14 includes batteries having a impedance responses with temperature, controller 200 may selectively increase the cooling of one or more battery packs 15 that have an increased current flow relative to the other battery packs 15. Coupling the heating and/or cooling of cabin 24, battery system 14, and power electronics 30 may help to provide heat transfer between the refrigerant and ambient air, as well as between the refrigerant, the air within cabin 24, and the coolant coupled to battery system 14 and power electronics 30. The coupling may provide for a more efficient heating or cooling of the various components. Reducing energy consumption (e.g., from battery system 14) required for thermal management may extend the operating time or range of EV 10. Additionally, the thermal management of system 100 may be controlled via control valves 32, 34 and reversing valve 36, allowing for the various cooling or heating configurations discussed herein to be implemented on EV 10 without changing or replacing the components of system 100 during the operation of EV 10.

While principles of the present disclosure are described herein with reference to a temperature control system for various components of an electric vehicle, it should be understood that the disclosure is not limited thereto. Rather, the systems described herein may be employed to heat or cool the batteries and other components in any application. Also, those having ordinary skill in the art and access to the teachings provided herein will recognize additional modifications, applications, embodiments, and substitution of equivalents all fall within the scope of the embodiments described herein. Accordingly, the disclosure is not to be considered as limited by the foregoing description. For example, while certain features have been described in connection with various embodiments, it is to be understood that any feature described in conjunction with any embodiment disclosed herein may be used with any other embodiment disclosed herein.

We claim:

1. A temperature control system for an electric vehicle, comprising:

a cabin temperature control system configured to control flow of a refrigerant through one or more heat exchangers to control a temperature of a cabin of the electric vehicle;

a battery temperature control system configured to control a flow of a coolant through one or more heat exchangers to control a temperature of a battery system of the electric vehicle; and a power electronics temperature control system configured to control the flow of coolant through one or more heat exchangers to control a temperature of one or more power electronics, wherein, in a first configuration of the temperature control system, the battery temperature control system and the power electronics temperature control system are thermally isolated, and, in a second configuration, the battery temperature control system and the power electronics temperature control system thermally interact, and wherein the power electronics temperature control system is cooled solely by a coolant passing through an outside air heat exchanger in the first configuration.

2. The temperature control system of claim 1, further including at least two control valves that control the flow of coolant through the battery temperature control system and the power electronics temperature control system.

3. The temperature control system of claim 2, wherein the at least two control valves are four-way control valves.

4. The temperature control system of claim 1, wherein the cabin temperature control system includes a reversing valve, a compressor, the outside air heat exchanger, and at least one inside air heat exchanger.

5. The temperature control system of claim 4, wherein the reversing valve is configured to switch between a cooling mode and a heating mode of the cabin.

6. The temperature control system of claim 1, wherein each of the battery temperature control system and the power electronics temperature control system include an expansion tank and a pump, and wherein the battery temperature control system further includes a heater.

7. The temperature control system of claim 1, wherein, in the first configuration, fluid within the battery temperature control system does not intermix with fluid within the power electronics temperature control system, and wherein, in the second configuration, the fluid within the battery temperature control system intermixes with the fluid within the power electronics temperature control system.

8. The temperature control system of claim 1, wherein the cabin temperature control system includes the outside air heat exchanger and at least one inside air heat exchanger.

9. The temperature control system of claim 8, wherein the cabin temperature control system further includes a plate heat exchanger connected in parallel with the at least one inside air heat exchanger.

10. The temperature control system of claim 8, further including a first expansion valve adjacent to the plate heat exchanger and a second expansion valve adjacent to the at least one inside air heat exchanger, wherein, in a cooling mode, the first expansion valve is upstream of the plate heat exchanger and the second expansion valve is upstream of the at least one inside air heat exchanger, wherein, in a heating mode, the first expansion valve is downstream of the plate heat exchanger and the second expansion valve is downstream of the at least one inside air heat exchanger.

11. A method of operating a temperature control system of an electric vehicle, comprising:
    directing a flow of coolant (a) through fluid conduits of a battery temperature control system to control a temperature of a battery system of the electric vehicle and/or (b) through fluid conduits of a power electronics temperature control system to control the temperature of power electronics of the electric vehicle;
    selecting between a first configuration and a second configuration of the temperature control system, wherein, in the first configuration, the coolant in the fluid conduits of the battery temperature control system does not intermix with the coolant in the fluid conduits of the power electronics temperature control system, and in the second configuration, the coolant in the fluid conduits of the battery temperature control system intermixes with the coolant in the fluid conduits of the power electronics temperature control system, and
    cooling the power electronics temperature control system solely by a coolant passing through an outside air heat exchanger in the first configuration.

12. The method of claim 11, wherein in the first configuration, the battery system and the power electronics are thermally isolated from each other, and in the second configuration the battery system and the power electronics are thermally coupled together via the coolant.

13. The method of claim 11, wherein the flow of the coolant through the battery temperature control system and through the power electronics temperature control system is controlled by at least one control valve.

14. The method of claim 13, wherein the at least one control valve is a four-way control valve.

15. The method of claim 11, further comprising selectively controlling the flow of a refrigerant through a cabin temperature control system of the electric vehicle, wherein the cabin temperature control system controls a temperature of a passenger cabin of the electric vehicle.

16. The method of claim 11, wherein in the second configuration, the refrigerant in the cabin temperature control system thermally interacts with the coolant in the battery temperature control system and the power electronics temperature control system.

17. An electric vehicle, comprising:
    a body enclosing a cabin, wherein a temperature in the cabin is regulated by a cabin temperature control system;
    a battery system to power the electric vehicle, wherein a temperature of the battery system is regulated by a battery temperature control system;
    one or more power electronics, wherein a temperature of the one or more power electronics is regulated by a power electronics temperature control system, the power electronics temperature control system being cooled solely by a coolant passing through an outside air heat exchanger in a first configuration; and
    a controller configured to selectively (a) thermally decouple the cabin temperature control system, the battery temperature control system, and the power electronics temperature control system from each other, and (b) thermally couple at least two of the cabin temperature control system, the battery temperature control system, and the power electronics temperature control system together.

18. The electric vehicle of claim 17, wherein the cabin temperature control system includes a reversing valve and a compressor, wherein the position of the reversing valve controls whether the cabin temperature control system is a cooling mode or in a heating mode to either cool or heat the air within the cabin.

19. The electric vehicle of claim 17, wherein the controller thermally couples at least two of the cabin temperature control system, the battery temperature control system, and the power electronics temperature control system together by (i) directing a fluid flowing through one of the cabin temperature control system, the battery temperature control system, or the power electronics temperature control system to flow through another of the cabin temperature control system, the battery temperature control system, and the power electronics temperature control system, or (ii) transferring heat between fluids flowing through at least two of the cabin temperature control system, the battery temperature control system, and the power electronics temperature control system.

20. The electric vehicle of claim 19, further comprising two four-way control valves, and wherein selectable configurations of the two four-way control valves (i) thermally decouples the cabin temperature control system, the battery temperature control system, and the power electronics temperature control system from each other, and (ii) thermally couples at least two of the cabin temperature control system, the battery temperature control system, and the power electronics temperature control system together.

* * * * *